(No Model.)
P. KANGLEY.
GAGE FOR CORN PLANTERS.
No. 443,832. Patented Dec. 30, 1890.
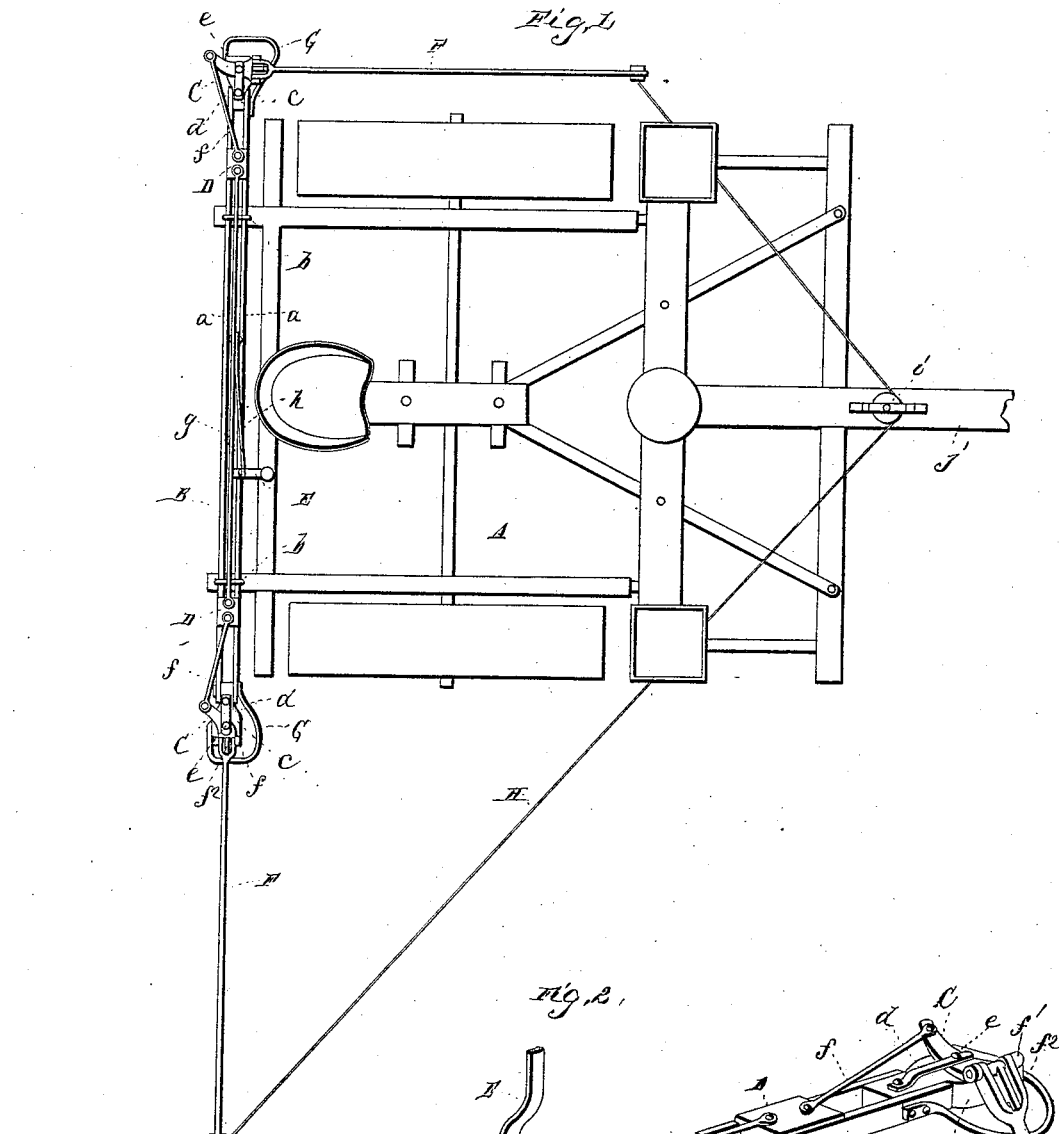
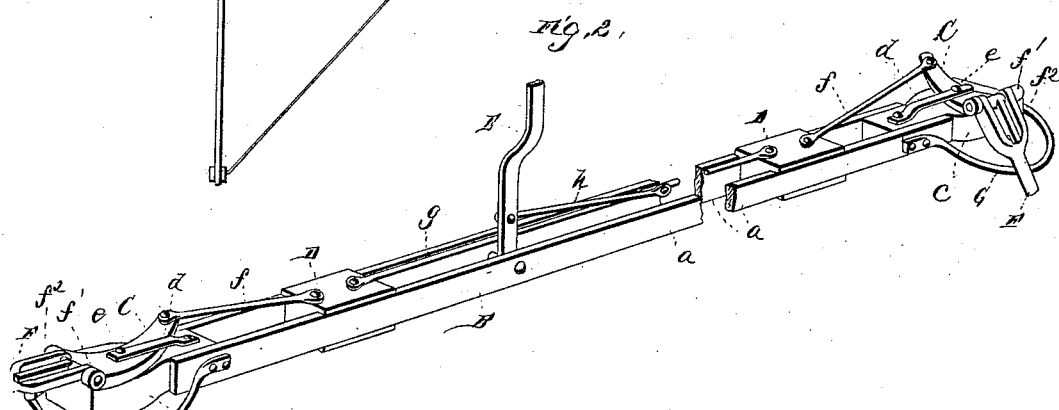
Witnesses
Inventor
Patrick Kangley
by E.W. Anderson,
Attorney

UNITED STATES PATENT OFFICE.

PATRICK KANGLEY, OF RANDALIA, IOWA.

GAGE FOR CORN-PLANTERS.

SPECIFICATION forming part of Letters Patent No. 443,832, dated December 30, 1890.

Application filed August 9, 1890. Serial No. 361,516. (No model.)

*To all whom it may concern:*

Be it known that I, PATRICK KANGLEY, a citizen of the United States, and a resident of Randalia, in the county of Fayette and State of Iowa, have invented certain new and useful Improvements in Gages for Corn-Planters; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a representation of the invention and is a top plan view. Fig. 2 is a perspective view of the frame B.

This invention relates to certain improvements in corn-planters; and it consists in the novel construction and combination of parts hereinafter disclosed.

In the drawings, A refers to a planter or machine to which my invention is applied, described as follows:

B is a frame, consisting of parallel bars $a$ $a$, suitably secured, preferably by staples or keepers $b$, upon the rear ends of side bars of the planter, and having bolted to and between their ends brackets $c$. Upon the brackets are pivoted levers C, arranged to turn or move under strap-pieces $d$, secured at one end to said brackets and having pivot-bolts $e$ passed through their opposite ends and through and held to said brackets by nuts or otherwise. The inner ends of the levers C are connected by short rods $f$ to slides D, arranged upon and between the parallel bars $a$ $a$ of the frame A and connected together by a long rod $g$, adapted to be actuated by a hand-lever E, pivoted to and between said bars and connected by a link or rod $h$ to said rod $g$.

F F are stout rods or markers to mark or score the ground for planting, articulated or pivoted at their inner upper ends between elevated ear-lugs $f'$ upon the opposite ends of the levers C, and adapted to ride upon cam rails or shoes G, secured at one end to and standing outward from the brackets $c$ and at their other ends to the inner bar $a$ of the frame A at its ends. The markers are upheld at their inner ends by angle-lever $f^2$, pivoted upon the pivots of the markers.

The outer ends of the markers F are connected to the ends of a line or cable H, carried or passed in contact with a pulley $i$, hung or supported upon the stub-tongue $j$ of the planter. It will therefore be seen that by the required actuation of the hand-lever E either one or the other of the markers is lowered into contact with the ground or elevated, according to the direction the machine or planter is moving in.

Having described this invention, what I claim, and desire to secure by Letters Patent, is—

1. In a planter, the marking device comprising the frame having the markers proper pivoted to levers upon brackets secured to and between the ends of said frame, slides working upon said frame, and rods or links connecting said slides to said levers and to a hand-lever, substantially as described.

2. In a planter, the combination of the frame comprising the parallel bars and secured upon the planter, the markers pivoted to the outer ends of levers pivoted upon brackets secured to said bars, the slides connected to said levers and to a hand-lever, and the cam rails or shoes secured to said bars, substantially as set forth.

3. In a planter, the marking device comprising the frame formed of parallel bars secured to the main frame and having brackets $c$ secured to and between their ends, levers C, pivoted on said brackets, rods connecting the inner ends of said levers to slides working upon and between the parallel bars, rods or links connecting said slides with an actuating-lever, and rods or markers pivoted to the opposite ends of levers C and riding upon cam rails or shoes secured to said bars and brackets, and a line or cord connecting the outer ends of said markers, substantially as described.

In testimony whereof I affix my signature in presence of two witnesses.

PATRICK KANGLEY.

Witnesses:
FRED G. SORG,
H. D. SIMAR.